United States Patent
Ho et al.

(10) Patent No.: US 11,054,895 B2
(45) Date of Patent: Jul. 6, 2021

(54) METHOD OF DISPLAY USER MOVEMENT IN VIRTUAL REALITY SYSTEM AND RELATED DEVICE

(71) Applicant: HTC Corporation, Taoyuan (TW)

(72) Inventors: Wei-Yi Ho, Taoyuan (TW); Yu-Chun Lin, Taoyuan (TW); Chuan-Hung Chung, Taoyuan (TW); Yang-Chen Fan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 7 days.

(21) Appl. No.: 15/894,950

(22) Filed: Feb. 13, 2018

(65) Prior Publication Data

US 2019/0033960 A1 Jan. 31, 2019

Related U.S. Application Data

(60) Provisional application No. 62/537,471, filed on Jul. 27, 2017.

(51) Int. Cl.
*G06F 3/01* (2006.01)
*G06F 3/03* (2006.01)
(Continued)

(52) U.S. Cl.
CPC ............ *G06F 3/011* (2013.01); *A63F 13/42* (2014.09); *A63F 13/52* (2014.09);
(Continued)

(58) Field of Classification Search
CPC .... G06F 3/011; G06F 3/04815; G06F 3/0308; A63F 13/42; A63F 13/52; A63F 13/5252; A63F 13/5258; A63F 2300/8082
(Continued)

(56) References Cited

U.S. PATENT DOCUMENTS

| 2014/0125698 A1* | 5/2014 | Latta ...................... G06F 3/011 345/633 |
| 2014/0186002 A1 | 7/2014 | Hanaya |
| 2017/0068323 A1 | 3/2017 | West |

FOREIGN PATENT DOCUMENTS

| CN | 103785169 A | 5/2014 |
| CN | 107045201 A | 8/2017 |

(Continued)

OTHER PUBLICATIONS

Search Report dated Nov. 22, 2018 for EP application No. 18184906.8, pp. 1-10.

(Continued)

*Primary Examiner* — Amare Mengistu
*Assistant Examiner* — Gloryvid Figueroa-Gibson
(74) *Attorney, Agent, or Firm* — Winston Hsu

(57) ABSTRACT

A method of display user movement in a computing device of a virtual reality system is disclosed. The method comprises generating a first image in a first-person perspective with a first-person control, simulating an avatar according to a first control signal received from a controller of the virtual reality system, and generating a second image including the avatar in the first-person perspective with a third-person control, wherein the first-person perspective indicates that a user sees images as if seen through the avatar's eyes, and a field of view of the avatar is controlled by the user, the first-person control indicates that a user's movement is displayed by a relative position between the avatar and a scene of the images, and the third-person control indicates that the user's movement is displayed by different locations of the avatar in the images.

10 Claims, 13 Drawing Sheets

(51) Int. Cl.
    *A63F 13/52*         (2014.01)
    *A63F 13/5258*     (2014.01)
    *A63F 13/5252*     (2014.01)
    *A63F 13/42*         (2014.01)
    *G06F 3/0481*      (2013.01)

(52) U.S. Cl.
    CPC ...... *A63F 13/5252* (2014.09); *A63F 13/5258* (2014.09); *G06F 3/0308* (2013.01); *G06F 3/04815* (2013.01); *A63F 2300/8082* (2013.01)

(58) Field of Classification Search
    USPC .......................................................... 345/156
    See application file for complete search history.

(56) References Cited

FOREIGN PATENT DOCUMENTS

| | | |
|---|---|---|
| TW | 201329853 A1 | 7/2013 |
| TW | I648655 B | 1/2019 |
| WO | 2014/071331 A1 | 5/2014 |

OTHER PUBLICATIONS

Notice of Allowance dated Sep. 19, 2018 for the Taiwan application No. 107110382, filing date Mar. 27, 2018, pp. 1-4.
Office action dated Aug. 2, 2019 for the China application No. 201810204762.1, filing date Mar. 13, 2018, p. 1-8.
Office action dated Aug. 19, 2019 for TW application No. 107137002, pp. 1-4.

\* cited by examiner

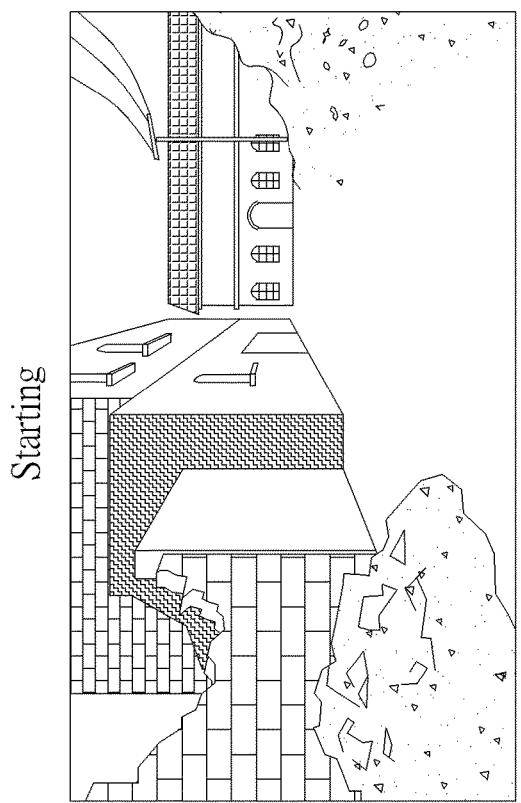
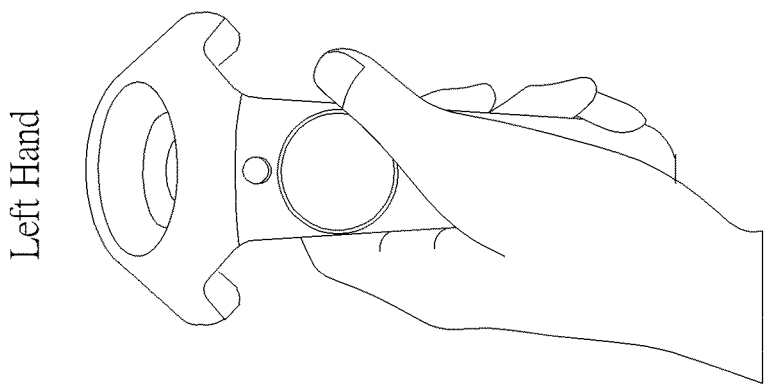
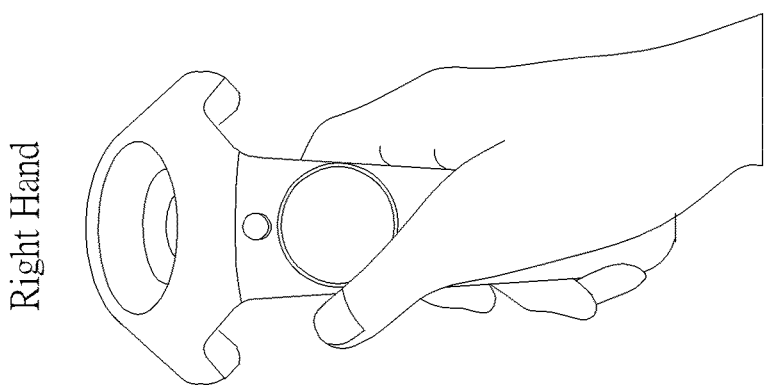
FIG. 4

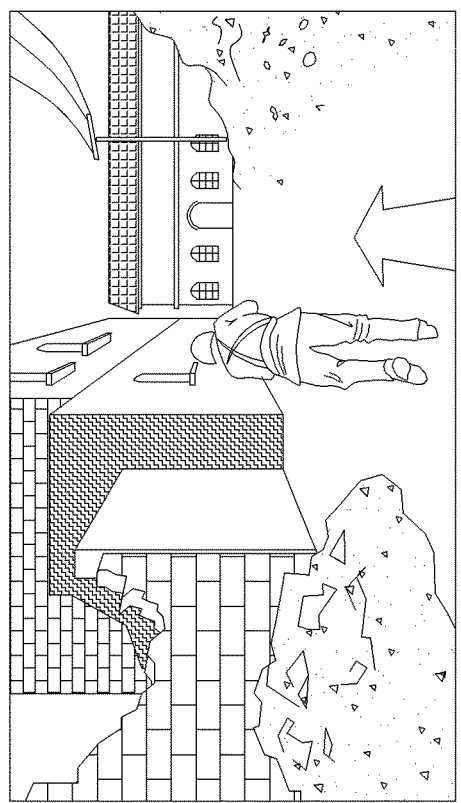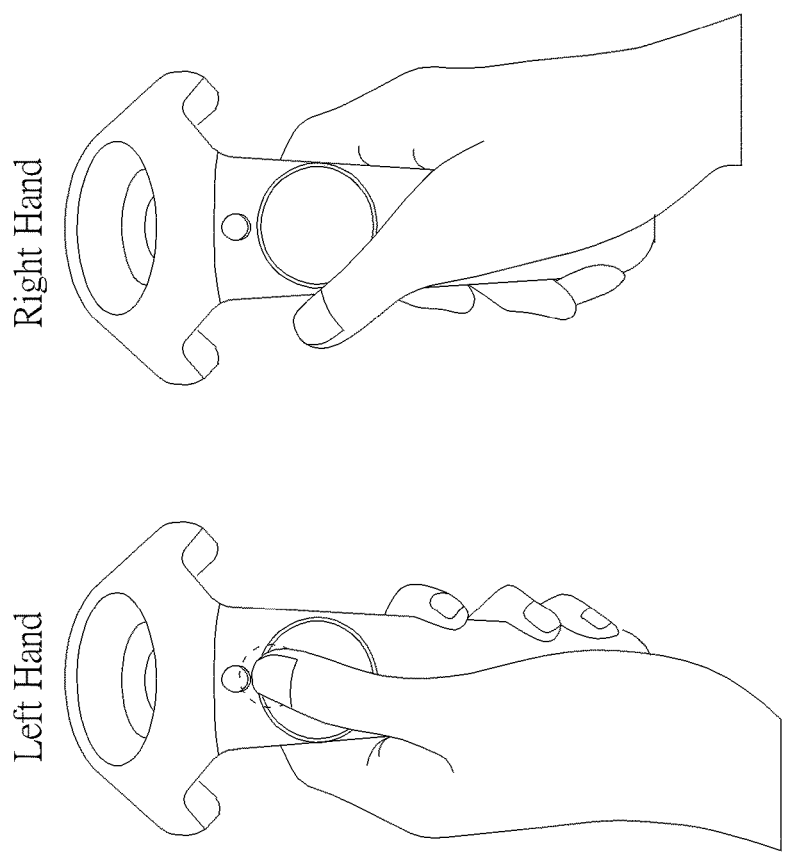
FIG. 11

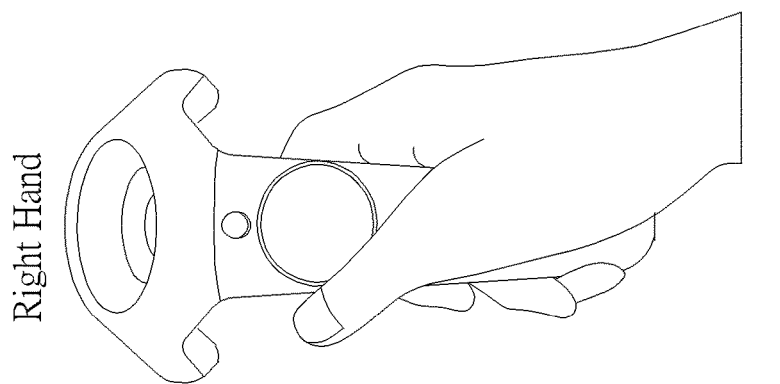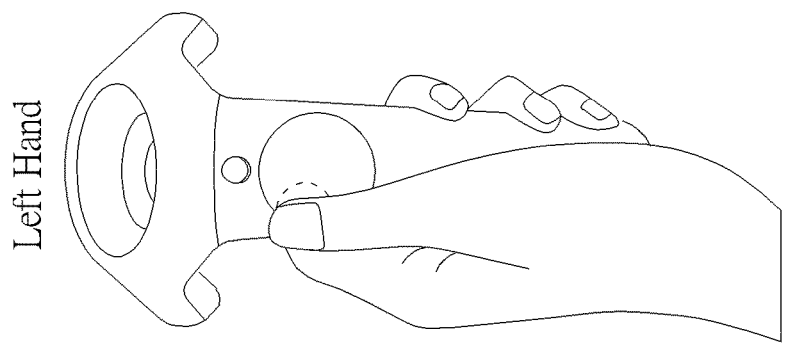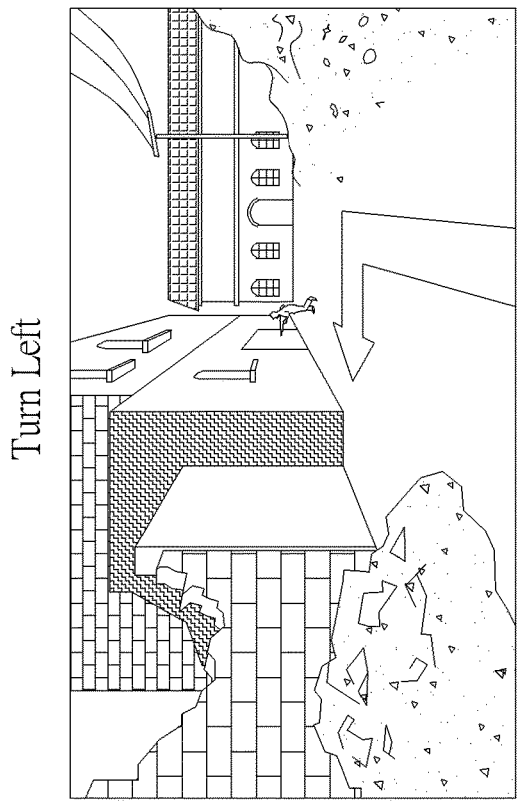
FIG. 12

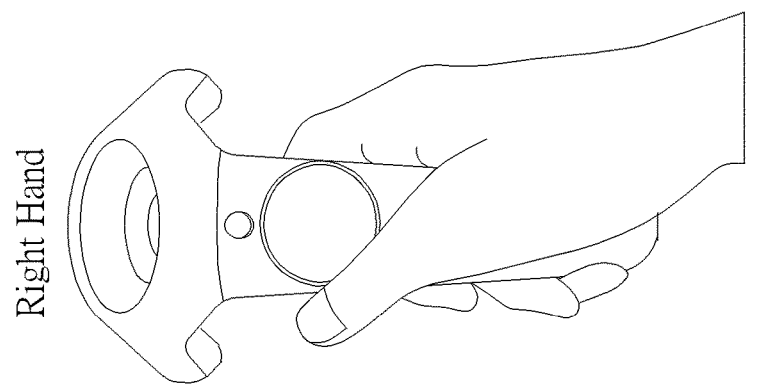
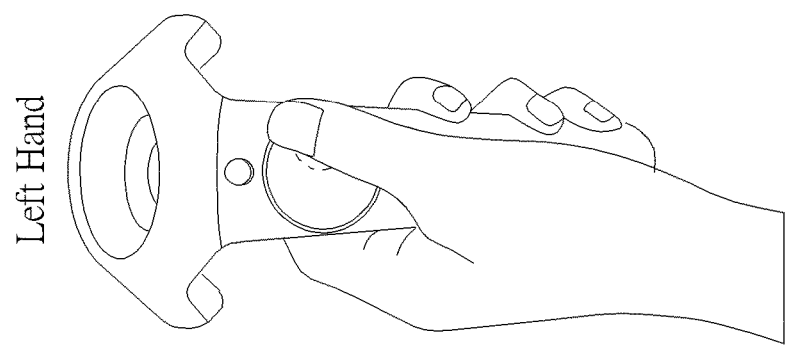
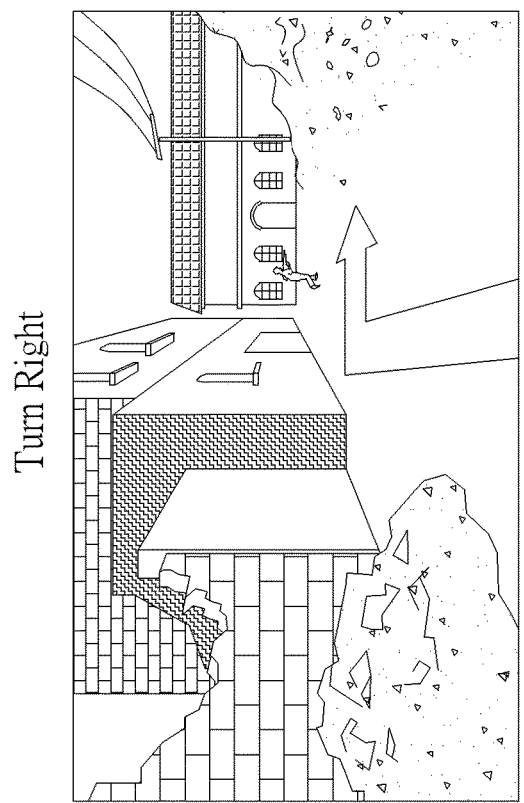
FIG. 13

METHOD OF DISPLAY USER MOVEMENT IN VIRTUAL REALITY SYSTEM AND RELATED DEVICE

CROSS REFERENCE TO RELATED APPLICATIONS

This application claims the benefit of U.S. Provisional Application No. 62/537,471, filed on Jul. 27, 2017 and entitled "Teleportation gesture", the contents of which are incorporated herein in their entirety.

BACKGROUND OF THE INVENTION

1. Field of the Invention

The present disclosure relates to a method used in a virtual reality system, and more particularly, to a method of display user movement in a virtual reality environment.

2. Description of the Prior Art

Most virtual reality (VR) system can track user's movement within a room-scale area from human interface devices carried by a user. The human interface device (e.g. joystick, controller, touchpad, etc.) is used for the user to interact with a software system, for example, a VR game, executed by a computing device. In addition, a head-mounted display (HMD) worn by the user is used for displaying the interacting images generated by the computing device to the user for VR experience.

Conventionally, the VR images displayed on the HMD are in first-person perspective and with first-person control. The first-person perspective features that the player sees VR images as if seen through the avatar's eyes, where the field of view of the avatar is controlled by the player, and first-person control features that the player's movement is displayed by relative position between the avatar and a scene of the first-person perspective image, to create a movement illusion to the player. For example, when the player is moving forward, the VR images in the HMD shall display the scene gradually closed to the avatar without on-screen avatar. In comparison, the conventional third-person perspective and third-person control features that the player sees VR images as if seen over the shoulder or in the rear of the avatar, and the player's movement is displayed by avatar's location in a scene of the third-person perspective image. For example, when the player is moving forward, the VR images in the HMD shall display the on-screen avatar in different locations of the scene.

For most of the VR experience, users need to pursue a much bigger area to explore in the VR environment. There are two common display solutions that allow users to feel he/she is moving around in the VR environment:

1. Artificial locomotion movement: user presses a direction key on the touchpad or pushes an analog joystick, to control the movement in the VR environment. In this case, the user sees images quickly played on the HMD. Since user's view is dragged and moved directly, causing simulator sickness where users can feel dizziness and nausea. Note that, simulator sickness is one of the side effects of the VR system due to conflicting signals sent from the eyes and ears to the user's brain. Human body determines the movement by the eyes and the inner ear for balance, under normal circumstances, the two organs sent to the brain's message is uniform. But in VR presence, the sight seen by the eyes tells the brain that "I'm in motion", but the inner ear organs send a message to the resting state of the brain, which causing inconsistent messages in user's brain.

2. Teleportation movement: by holding a key (usually the touchpad), user will see an indicator or some guidance pointing to a selected location through the HMD and when releasing the key, users will be teleported to the selected location. Though it decreases the chance of getting simulator sickness, there is no transition between the original location and the target location. The user may feel distraction and visual discomfort due to teleportation.

As can be seen, both solutions for displaying user's movement in the VR environment have disadvantages, which may reduce user's willingness of VR immersion.

SUMMARY OF THE INVENTION

It is therefore an objective to provide a method of display user movement in a VR system and a related VR device to solve the above problems.

The present disclosure provides a method of display user movement in a computing device of a virtual reality system. The method comprises generating a first image in a first-person perspective with a first-person control, simulating an avatar according to a first control signal received from a controller of the virtual reality system, and generating a second image including the avatar in the first-person perspective with a third-person control, wherein the first-person perspective indicates that a user sees images as if seen through the avatar's eyes, and a field of view of the avatar is controlled by the user, the first-person control indicates that a user's movement is displayed by a relative position between the avatar and a scene of the images, and the third-person control indicates that the user's movement is displayed by different locations of the avatar in the images.

The present disclosure provides a virtual reality system for display user movement in a virtual reality. The virtual reality system comprises a computing device, for executing a software system to generate virtual reality images, a HMD, connecting to the computing device, for displaying the virtual reality images generated by the computing device and for generating position information to the computing device, and at least a controller, connecting to the computing device, for generating a control signal to the computing device, wherein the computing device includes a processing means for executing a program, and a storage unit coupled to the processing means for storing the program; wherein the program instructs the processing means to perform the following steps: generating a first image in a first-person perspective with a first-person control, simulating an avatar according to a first control signal received from the controller of the virtual reality system, and generating a second image including the avatar in the first-person perspective with a third-person control, wherein the first-person perspective indicates that a user sees images as if seen through the avatar's eyes, and a field of view of the avatar is controlled by the user, the first-person control indicates that a user's movement is displayed by a relative position between the avatar and a scene of the images, and the third-person control indicates that the user's movement is displayed by different locations of the avatar in the images.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 4-13 are schematic diagrams of movement image display according to embodiments of the present disclosure.

DETAILED DESCRIPTION

Figure 1:
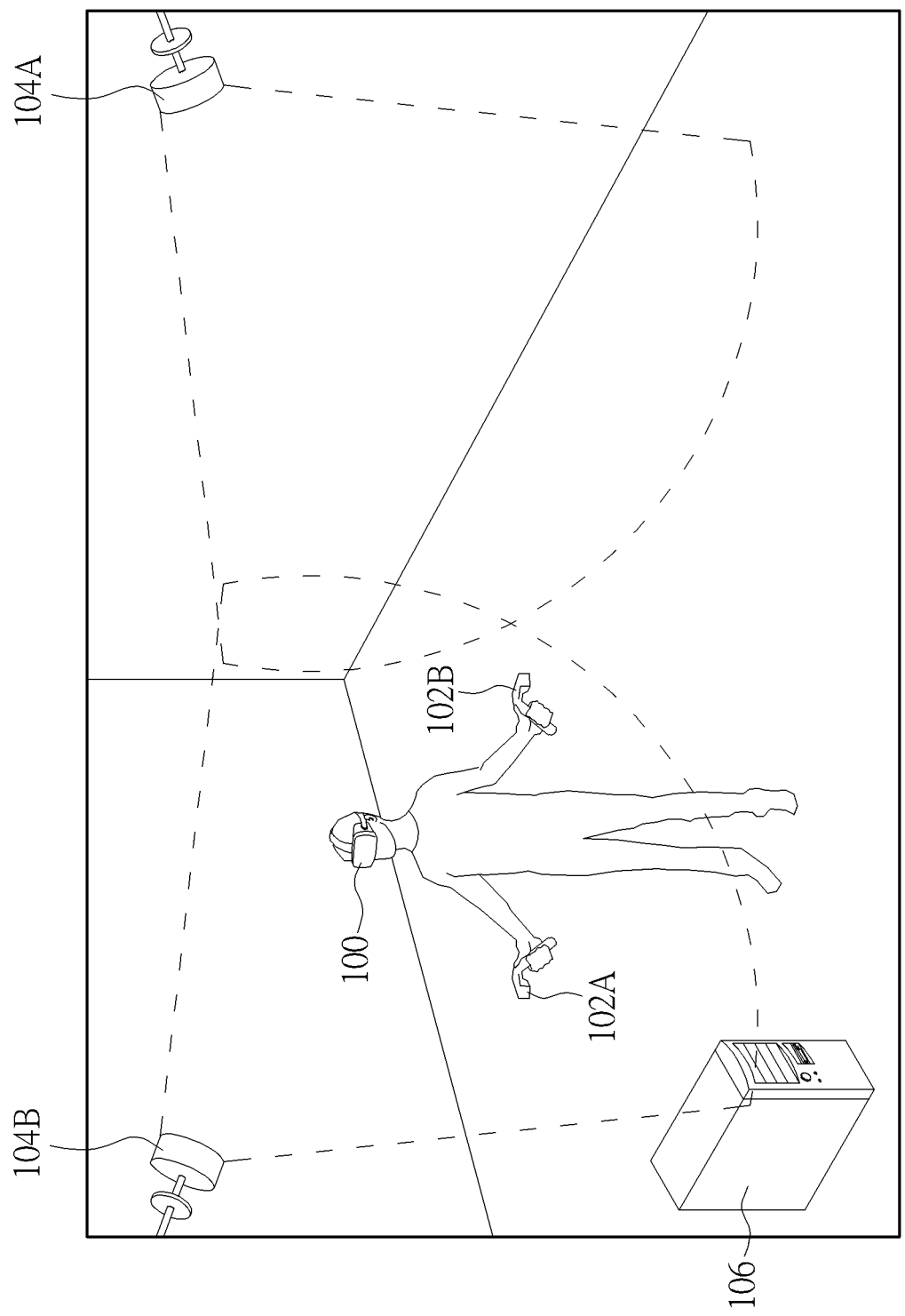
FIG. 1 is a schematic diagram of a virtual reality system according to one embodiment of the present disclosure.

Please refer to FIG. 1, which is a schematic diagram of a virtual reality system according to one embodiment of the present disclosure. The room-scale tracking mechanism of the virtual reality (VR) system (i.e. HTC VIVE) allows users to move and explore freely in the VR environment. In detail, the VR system includes a head-mounted display (HMD) 100, controllers 102A and 102B, lighthouses 104A and 104B, and a computing device 106 (e.g. a personal computer). The lighthouses 104A and 104B are used for emitting IR lights, the controllers 102A and 102B are used for generating control signals to the computing device 106, so that a player can interact with a software system, VR game, executed by the computing device 106, and the HMD 100 is used for display interacting images generated by the computing device 106 to the player. In addition, the HMD 100 and the controllers 102A and 102B each includes a plurality of sensors for detecting the vertical and horizontal IR lights from the lighthouses 104A and 104B, so as to locate HMD 100 and controllers' 102A and 102B positions associated to the lighthouses 104A and 104B. These position information and control signals from the HMD 100 and controllers 102A and 102B are transmitted to the computing device 106 for processing, and then responding to the HMD 100 for displaying the corresponding interacting images to the user, so that the user can be immersed into the VR environment.

Figure 2:
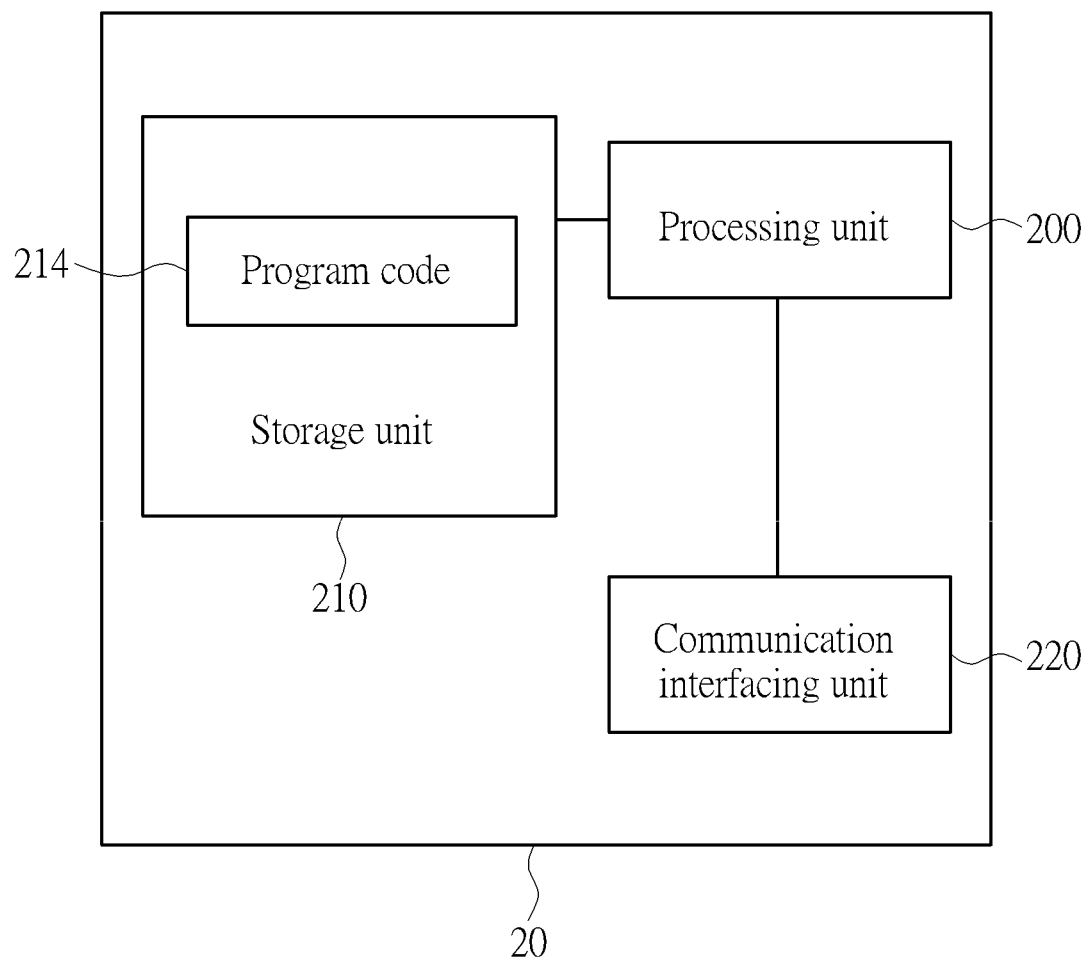
FIG. 2 is a schematic diagram of a virtual reality device of a virtual reality system according to one embodiment of the present disclosure.

FIG. 2 is a schematic diagram of a VR device according to one embodiment of the present disclosure. The VR device 20 may be the computing device 106 of FIG. 1, and includes a processing unit 200, such as a microprocessor or Application Specific Integrated Circuit (ASIC), a storage unit 210 and a communication interfacing unit 220. The storage unit 210 may be any data storage device that can store a program code 214, for access by the processing unit 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is applied with a wire or wireless communication for exchange signals with the HMD 100 and controllers 102A and 102B of FIG. 1 according to processing results of the processing unit 200.

Figure 3:
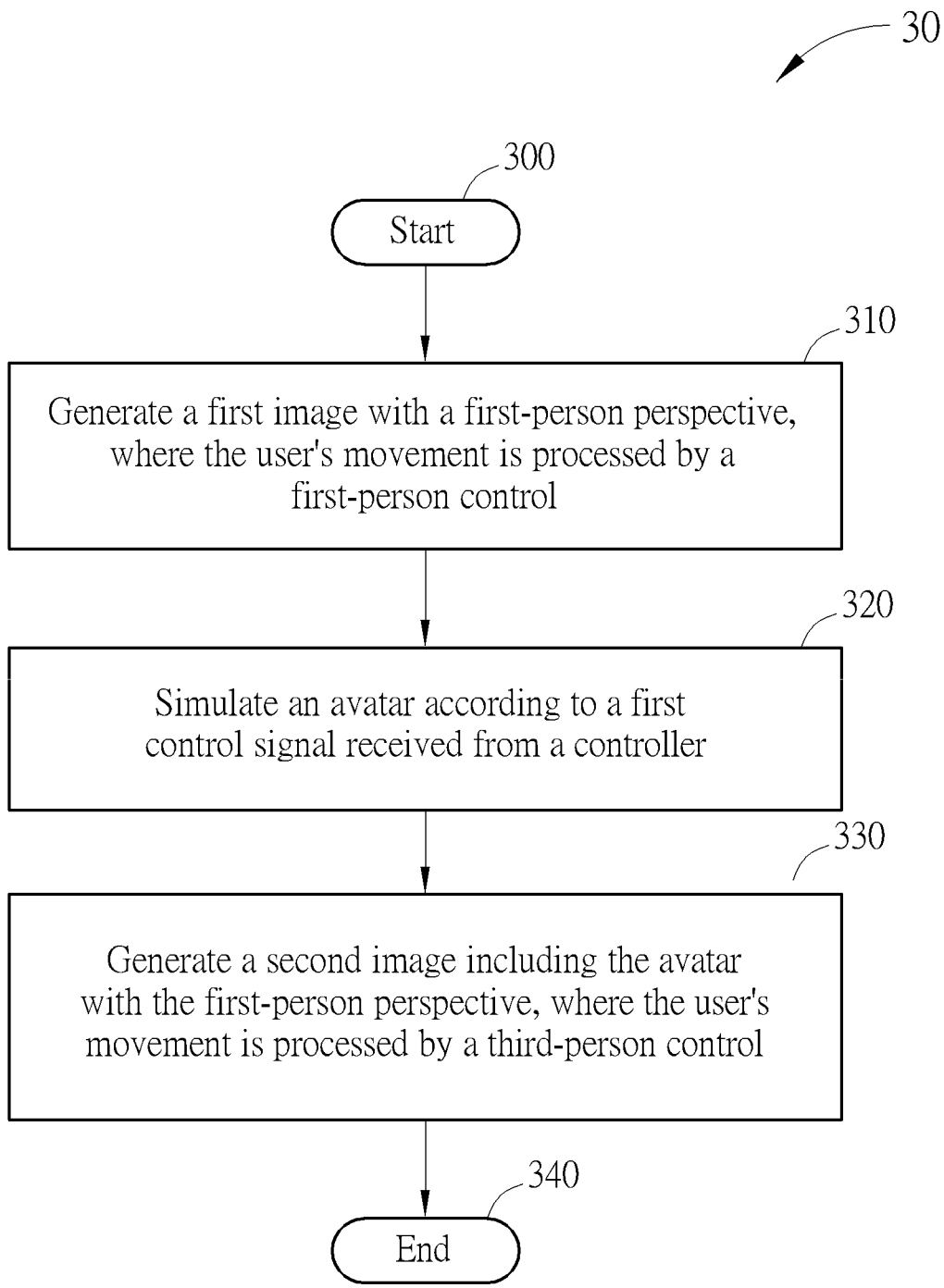
FIG. 3 is a flowchart according to an embodiment of the present disclosure.

Reference is made to FIG. 3. A flowchart of a process 30 according to an embodiment of the present disclosure is illustrated. The process 30 could be utilized in the VR device 20 of FIG. 2 for user movement display. The process 30 may be compiled into a program code 214 to be stored in the storage unit 210, and may include the following steps:

Step 300: Start.

Step 310: Generate a first image with a first-person perspective, where the user's movement is processed by a first-person control.

Step 320: Simulate an avatar according to a first control signal received from a controller.

Step 330: Generate a second image including the avatar with the first-person perspective, where the user's movement is processed by a third-person control.

Step 340: End.

According to the process 30, when an avatar mode is triggered by a control signal, the HMD displays the avatar in the first-person perspective image (namely on-screen avatar), and player's movement is displayed by the avatar indifferent locations of the first-person perspective image (namely third-person control). On the other hand, when the avatar mode is released, the HMD displays no avatar in the first-person perspective image, and the player's movement is displayed by the relative distances between the avatar and a scene of the first-person perspective image (namely first-person control). In a word, the VR game is operated in the first-person control or third-person control under the first-person perspective. That is, in this article, VR images are displayed only with first-person perspective. In addition, the first-person control or third-person control is operated based on the HMD and controllers worn by the player. When the player moves, positions of the HMD and the controllers may control the actions or movement of the avatar in the VR environment.

For artificial locomotion movement, VR images with the avatar, namely enabled avatar mode, can reduce the simulator sickness since the player focuses on avatar's motion. On the other hand, for teleportation movement, VR images with the avatar can enhance continuity in location changes. For example, when the avatar is reached to the target location, the user releases the avatar mode by the controllers or according to the HMD's position, and thus the HMD displays a scene corresponding to the avatar's last location, namely target location. With such manner, the user may feel he/she is transited from the original location to the target location. Moreover, with the avatar mode, other players in the same online VR game could see the player's avatar continuously moving without sudden appearance of the player in the VR environment, to increase the continuity in the VR game.

Note that, conventional VR game may be switched between the first-person perspective and third-person perspective, which may causes scene confusing. However, in the present invention, the VR image displayed on the HMD is always in the first-person perspective, and therefore there is no field of view switching in the avatar mode. In addition, the player's movement is displayed with the avatar's locations in the first-person perspective image, namely third-person control under first-person perspective.

In an embodiment, when players need to move further in the VR game/VR environment, they can press and hold the left hand touchpad of the controller and switch to third-person control (namely avatar mode triggering). The players' view angle will not move but their avatars will be on-screen and controllable. Instead of moving to the destination directly, players will be able to decide the moving direction and even the speed of their avatars. Once they have move their avatars to the desired location, players can release the touchpad and their view will be switched to the location of their avatars and get back to first-person control. By using this method, motion sickness and distraction during the movement is effectively decreased.

To accomplish abovementioned avatar mode triggering and third-person control under first-person perspective, the present invention proposes several ways as follows. Generally, the controllers of the VR system are capable of generating control signals, to enable the avatar mode in the VR game. However, the avatar mode triggering is not limited by the controllers, which could be triggered by the HMD (i.e. a predefined position) or any other VR devices, depending on VR game design choice.

Figure 5:
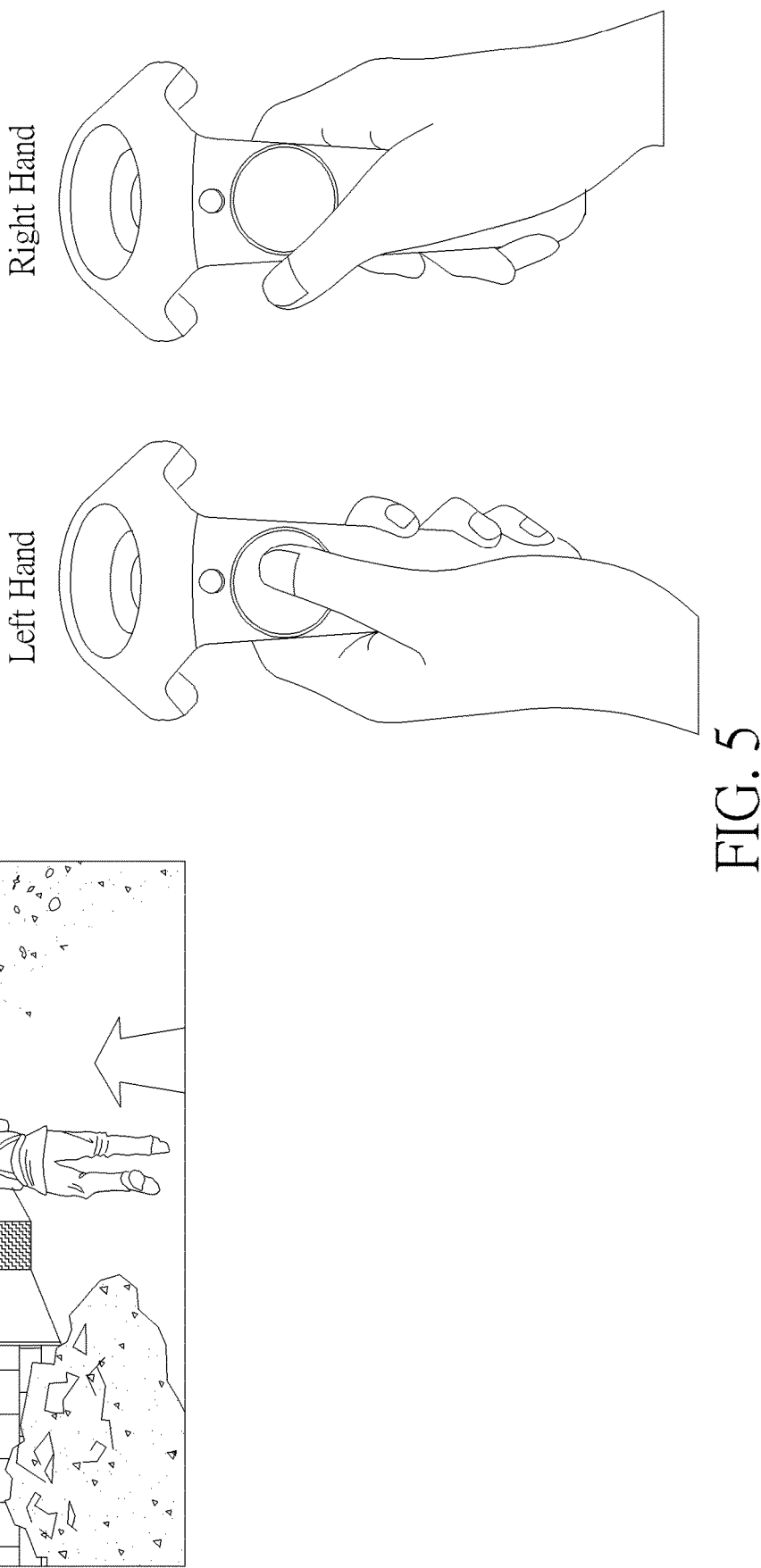

Reference is made to FIGS. 4-10. In the starting VR image of FIG. 4, the image angle is from first-person perspective corresponding to a position of the HMD worn by the player. In FIG. 5, the player pressed and hold left touchpad of the controller to enable the avatar mode, and tilt controller forward. Thus, the player will see the avatar presence and moving forward. That is, first-person control is switched to third-person control. In addition, the avatar's pose can be controlled by detecting the vertical position of HMD, i.e. walk pose when HMD is at normal position, and squat pose when HMD is at low position.

Figure 6:
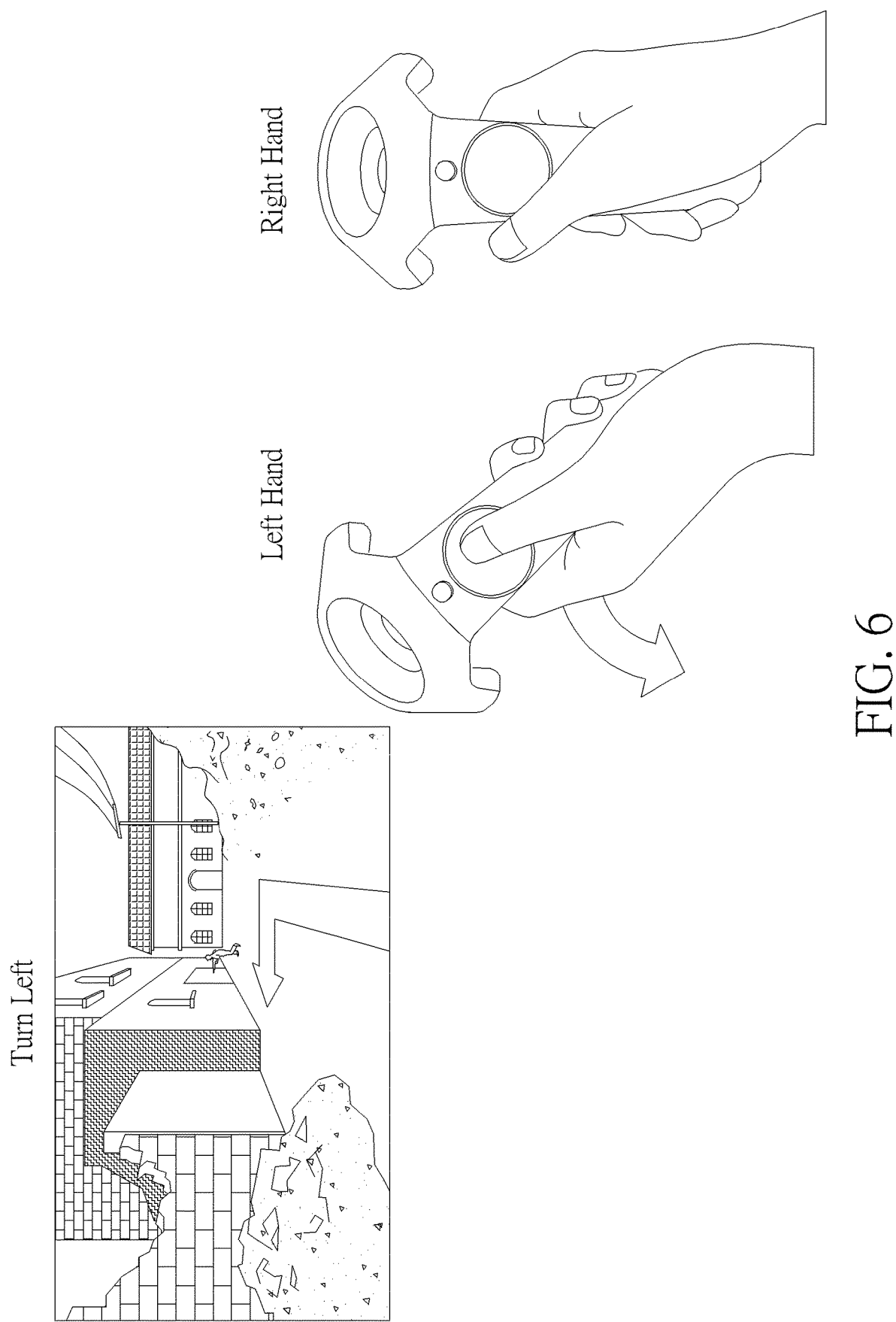
Figure 7:
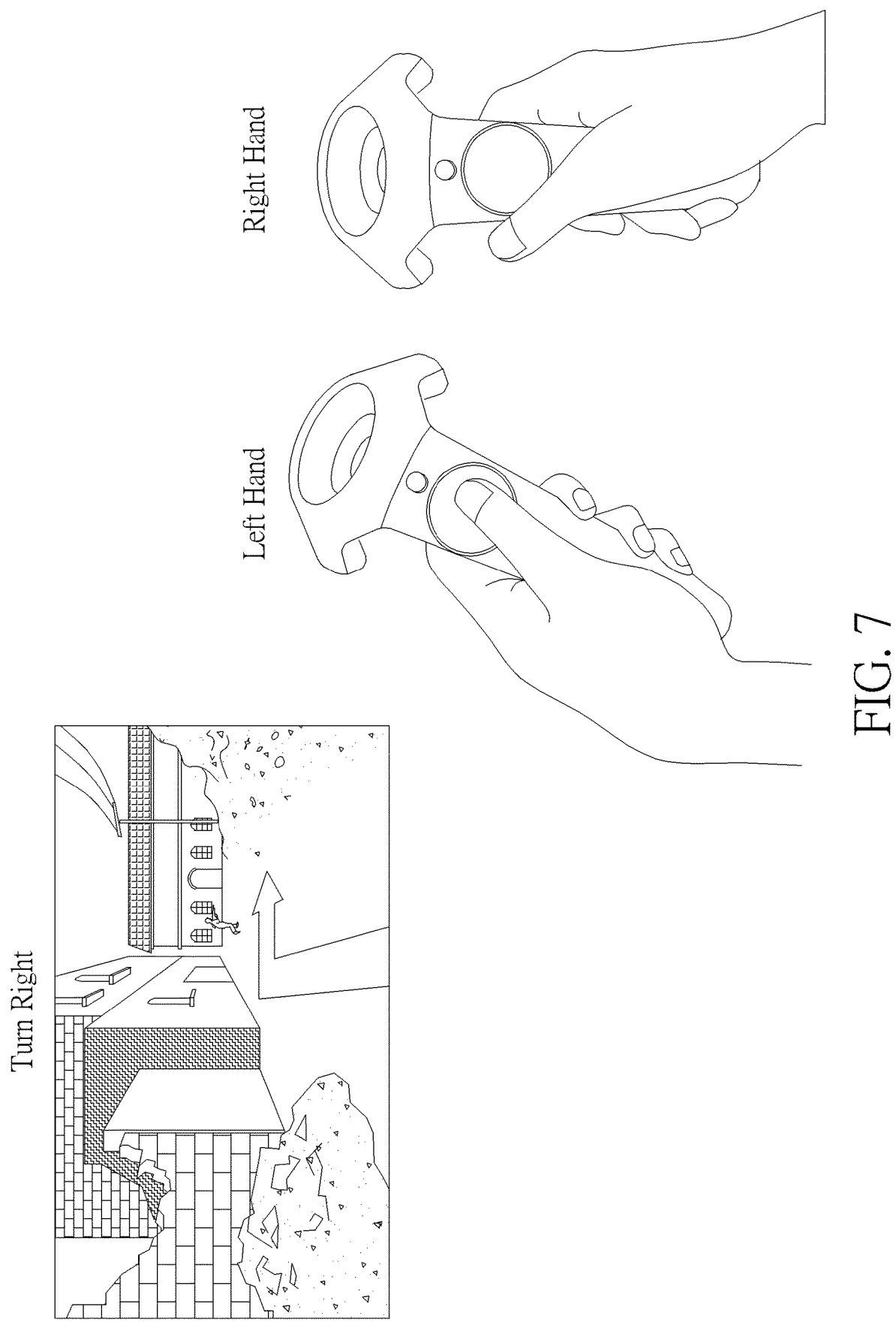

For avatar's moving direction control, reference is made to FIGS. 6-7. The player pressed and hold left touchpad and roll controller left to turn the avatar to turn left, and press and hold left touchpad and roll controller right to control the avatar turning right in the first-person perspective image.

Figure 8:
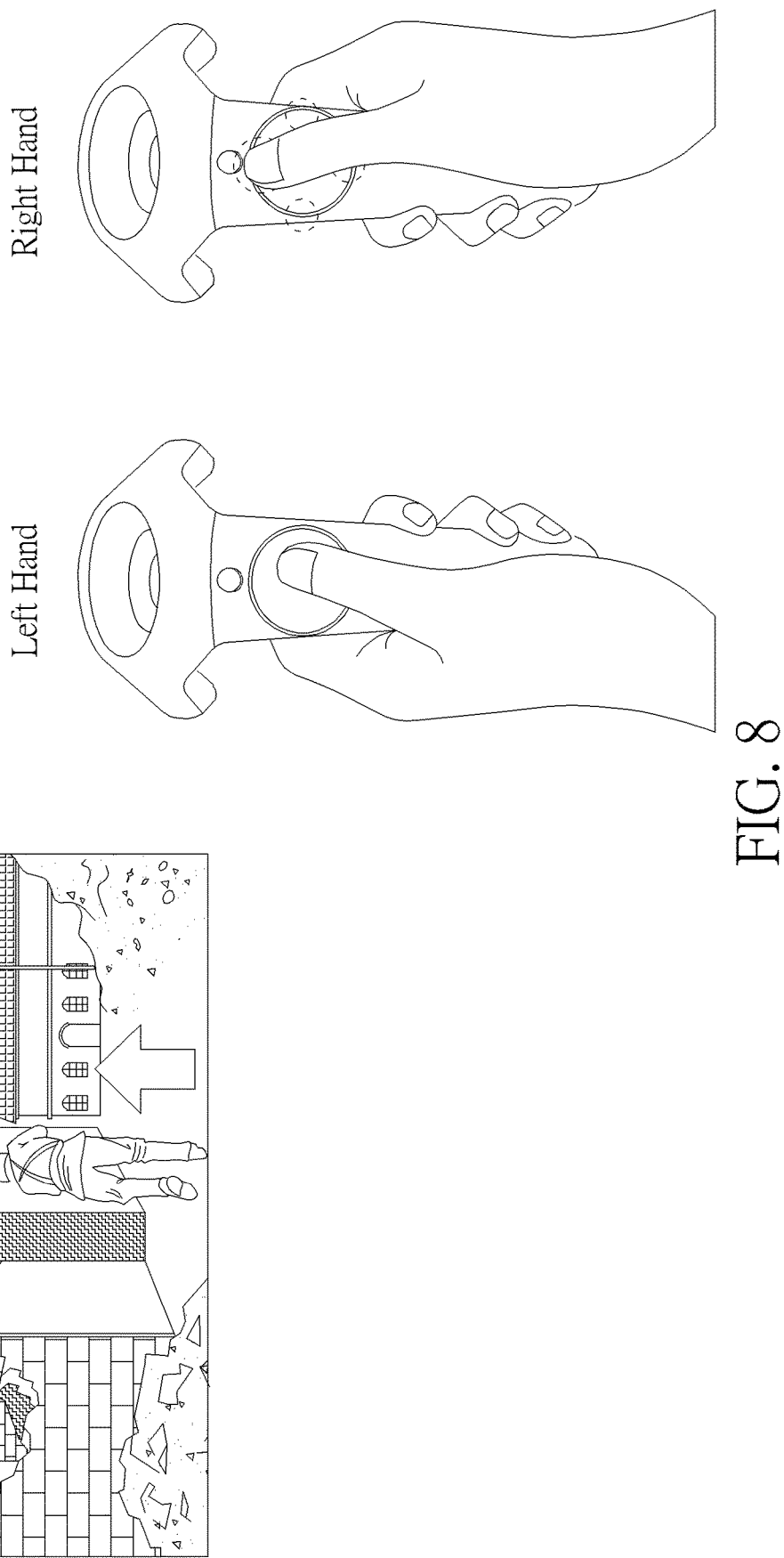
Figure 9:
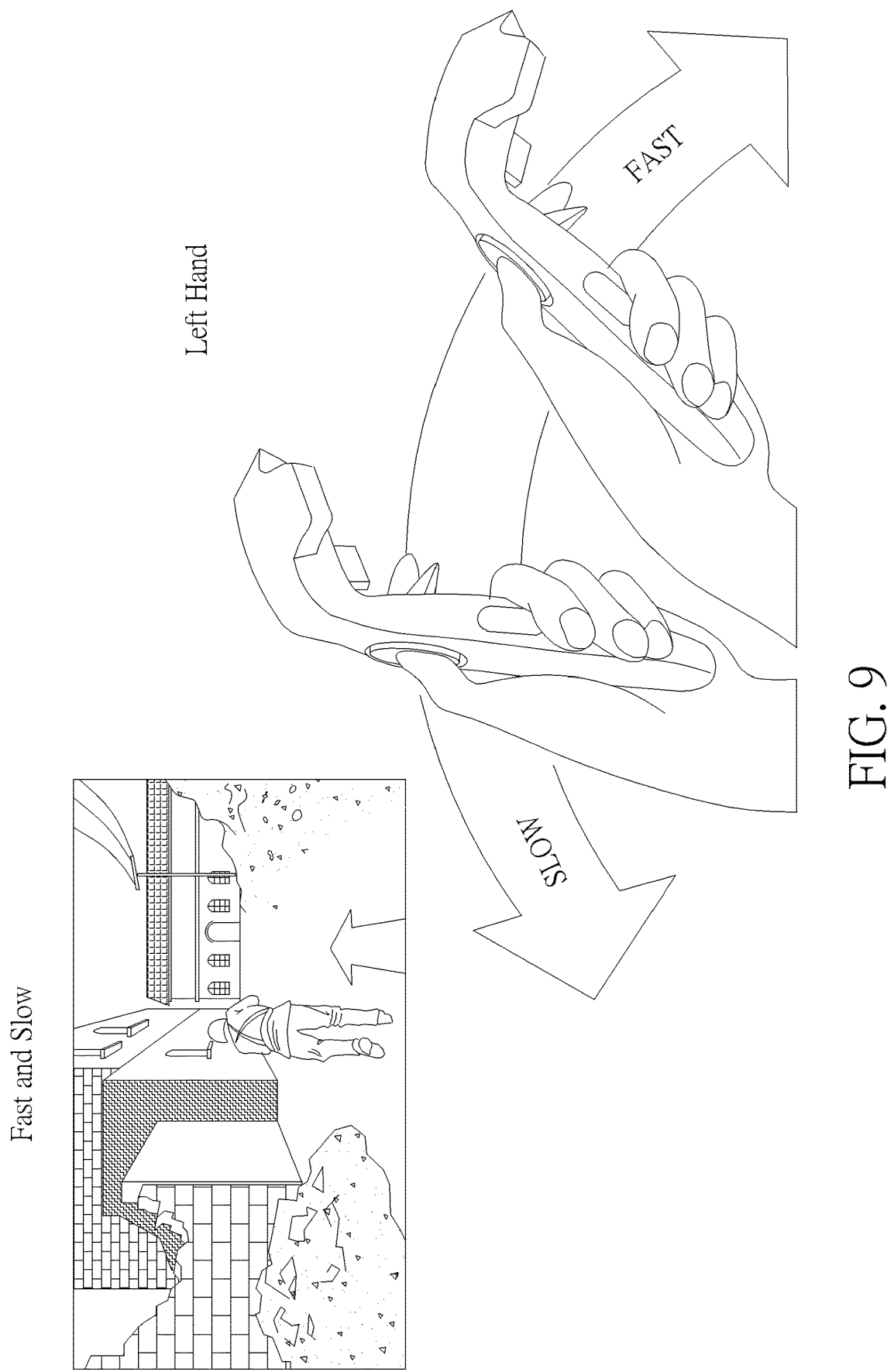

For avatar's action control, reference is made to FIG. 8. The player pressed on different coordinates of right touchpad to perform different action like jump, slid, takes cover, open doors, etc. For avatar's moving speed, reference is made to FIG. 9. The player pressed and hold left touchpad and tilt left controller to slow and fast the speed of avatar.

Figure 10:
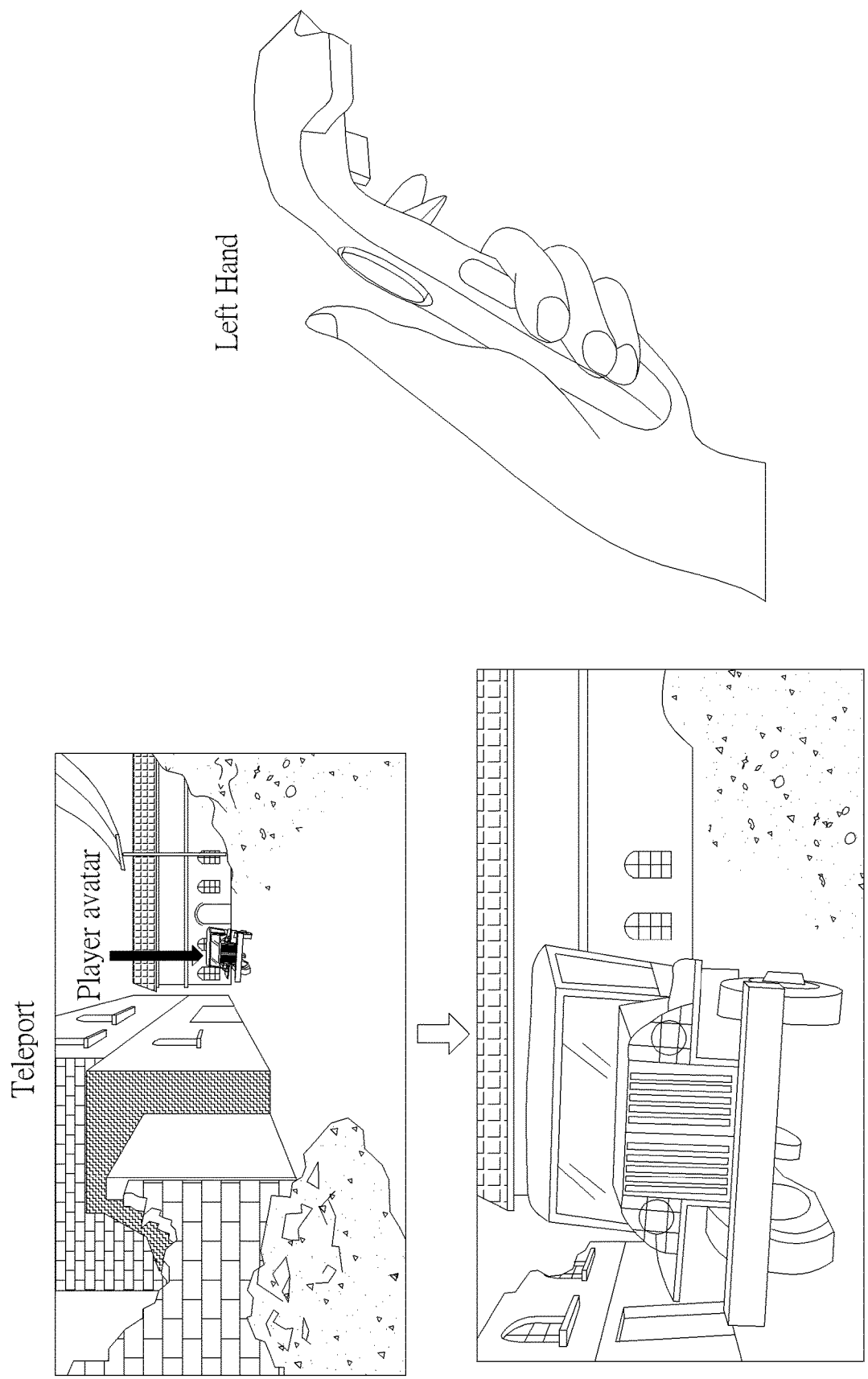

Reference is made to FIG. 10, the player releases left touchpad of the controller, to disable the avatar mode, namely back to first-person control. Thus, the player is teleported to avatar's last position and sees an image of the avatar's last position in the first-person perspective.

Note that, the avatar mode enabling or third-person control under first-person perspective may be realized by different way. For example, as shown in FIG. 11-13, the player may touch left touchpad and slide finger up to move forward. Touch left touchpad and slide finger left to turn left. Touch left touchpad and slide finger tight to turn right. Touch left touch pad and tilt left controller. The player control design is various; however, this article is aims at avatar mode enabled and avatar control in first-person perspective.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the VR device 20.

In conclusion, the present invention provides a VR display method for player movement in the VR environment, so as to solve the VR sickness problem. In detail, the player watches the avatar moving/action in the first-person perspective with third person control, so that the player in the cease position will not feel uncomfortable as in the teleportation or locomotion movement display. In addition, with avatar movement display, the VR system could be applied in world-scale area with better VR experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of display user control movement in a computing device of a virtual reality system including a head-mounted display (HMD) and a controller, the method comprising:

generating a first image in a first-person perspective with a first-person control setting, wherein the first-person perspective indicates that a user sees the first image as if seen through an avatar's eyes, and a field of view of the avatar is controlled by the user, and the first-person control setting indicates that the user's movement is displayed by a relative position between the avatar and a scene of images;

simulating the avatar according to a first control signal received from the controller of the virtual reality system;

switching the first-person control setting to a third-person control setting in the first-person perspective; and generating a second image with the third-person control setting when the first-person perspective is maintained, wherein the step of generating the second image in the first-person perspective with the third-person control setting comprises generating a pose scene of the avatar in the second image according to a position information of the HMD, wherein the second image in the first-person perspective is the same as the first image in the first-person perspective, except that the second image includes the avatar and the first image does not includes the avatar;

wherein the third-person control setting indicates that avatar movement and a location of the avatar displayed in the second image is controlled by the controller.

2. The method of claim 1, further comprising:
releasing the avatar according to a second control signal received from the controller.

3. The method of claim 1, wherein generating the second image including the avatar in the first-person perspective with the third-person control setting comprises:
receiving a control signal from the controller to move a position of the avatar from an original location to a target location; and
generating moving scenes of the avatar from the original location to the target location in the second image.

4. The method of claim 3, generating the second image including the avatar in the first-person perspective with the third-person control setting further comprises:
receiving the position information from the HMD.

5. The method of claim 3, further comprising:
releasing the avatar according to a second control signal from the controller; and
generating a third image corresponding to the target location in the first-person perspective with the first-person control setting.

6. A virtual reality system for display user control movement in a virtual reality, the virtual reality system comprising:
a computing device, for executing a software system to generate virtual reality images;
a head-mounted display (HMD), connecting to the computing device, for displaying the virtual reality images generated by the computing device and for generating position information to the computing device; and
at least a controller, connecting to the computing device, for generating a control signal to the computing device;
wherein the computing device includes:
a processing means for executing a program; and
a storage unit coupled to the processing means for storing the program; wherein the program instructs the processing means to perform the following steps:
generating a first image in a first-person perspective with a first-person control setting, wherein the first-person perspective indicates that a user sees the first image as if seen through an avatar's eyes, and a field of view of the avatar is controlled by the user, and the first-person control setting indicates that the user's movement is displayed by a relative position between the avatar and a scene of images;

simulating the avatar according to a first control signal received from the controller of the virtual reality system;

switching the first-person control setting to a third-person control setting in the first-person perspective; and generating a second image with the third-person control setting when the first-person perspective is maintained, wherein the step of generating the second image in the first-person perspective with the third-person control setting comprises generating a pose scene of the avatar in the second image according to a position information of the HMD, wherein the second image in the first-person perspective is the same as the first image in the first-person perspective, except that the second image includes the avatar and the first image does not include the avatar;

wherein the third-person control setting indicates that avatar movement and a location of the avatar displayed in the second image is controlled by the controller.

7. The virtual reality system of claim 6, wherein the program further instructs the processing means to perform the step of:
    releasing the avatar according to a second control signal received from the controller.

8. The virtual reality system of claim 6, wherein the program further instructs the processing means to perform the step of:
    receiving a control signal from the controller to move a position of the avatar from an original location to a target location; and
    generating moving scenes of the avatar from the original location to the target location in the second image.

9. The virtual reality system of claim 8, wherein the program further instructs the processing means to further perform the step of:
    receiving the position information from the HMD.

10. The virtual reality system of claim 8, wherein the program further instructs the processing means to perform the step of:
    releasing the avatar according to a second control signal from the controller; and
    generating a third image corresponding to the target location in the first-person perspective with the first-person control setting.

\* \* \* \* \*